(12) United States Patent
Yamashita et al.

(10) Patent No.: US 10,876,589 B2
(45) Date of Patent: Dec. 29, 2020

(54) SHOCK ABSORBER

(71) Applicant: HITACHI AUTOMOTIVE SYSTEMS, LTD., Ibaraki (JP)

(72) Inventors: Mikio Yamashita, Zama (JP); Fumiyuki Yamaoka, Sagamihara (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 59 days.

(21) Appl. No.: 15/755,329

(22) PCT Filed: Aug. 24, 2016

(86) PCT No.: PCT/JP2016/074615
§ 371 (c)(1),
(2) Date: Feb. 26, 2018

(87) PCT Pub. No.: WO2017/038571
PCT Pub. Date: Mar. 9, 2017

(65) Prior Publication Data
US 2018/0245660 A1      Aug. 30, 2018

(30) Foreign Application Priority Data

Aug. 31, 2015   (JP) ................................ 2015-171058

(51) Int. Cl.
*F16F 9/34*            (2006.01)
*F16F 9/46*            (2006.01)
(Continued)

(52) U.S. Cl.
CPC .................. *F16F 9/34* (2013.01); *F16F 9/18* (2013.01); *F16F 9/3484* (2013.01); *F16F 9/36* (2013.01);
(Continued)

(58) Field of Classification Search
CPC ........ F16F 9/34; F16F 9/36; F16F 9/18; F16F 9/3484; F16F 9/369; B60G 17/08; B60G 2500/11; B60G 13/08
See application file for complete search history.

(56) References Cited

U.S. PATENT DOCUMENTS 5,398,787 A * 3/1995 Woessner ............... B60G 17/08
                                                            188/266.6
5,730,261 A * 3/1998 Spakowski ............. F16F 9/465
                                                            188/266.6
(Continued)

FOREIGN PATENT DOCUMENTS

JP       8-135713         5/1996
JP       11-287281       10/1999
JP       2013-11342       1/2013

OTHER PUBLICATIONS

International Search Report dated Sep. 27, 2016 in International Application No. PCT/JP2016/074615.

*Primary Examiner* — Bradley T King
*Assistant Examiner* — James K Hsiao
(74) *Attorney, Agent, or Firm* — Wenderoth, Lind & Ponack, L.L.P.

(57) ABSTRACT

Provided is a shock absorber capable of smoothly changing a damping force in a low speed range of piston speed and of opening a main valve with a smaller differential pressure. An auxiliary valve (111) is provided on an upstream side of a main valve (27) in series with the main valve (27). Thus, the damping force in the low speed range of the piston speed can be smoothly changed. Further, the main valve (27) has a simply-supported structure in which an inner peripheral side thereof is prevented from being clamped and is supported in a cantilever state. Thus, the main valve (27) can be opened with a smaller differential pressure.

7 Claims, 6 Drawing Sheets

(51) Int. Cl.
  *B60G 17/08* (2006.01)
  *B60G 13/08* (2006.01)
  *F16F 9/348* (2006.01)
  *F16F 9/36* (2006.01)
  *F16F 9/18* (2006.01)
  *F16F 9/06* (2006.01)

(52) U.S. Cl.
  CPC ............... *F16F 9/369* (2013.01); *F16F 9/46* (2013.01); *B60G 13/08* (2013.01); *B60G 17/08* (2013.01); *B60G 2206/41* (2013.01); *B60G 2500/11* (2013.01); *F16F 9/062* (2013.01); *F16F 9/185* (2013.01); *F16F 2228/066* (2013.01); *F16F 2230/18* (2013.01)

(56) References Cited

U.S. PATENT DOCUMENTS

| | | | | |
|---|---|---|---|---|
| 6,155,391 A * | 12/2000 | Kashiwagi | ............... | F16F 9/348 188/266.6 |
| 7,766,137 B2 * | 8/2010 | De Kock | ............... | F16F 9/3485 188/282.6 |
| 7,770,983 B2 * | 8/2010 | Park | ............... | F16F 9/465 188/266 |
| 7,896,311 B2 * | 3/2011 | Jee | ............... | B60G 17/018 188/322.13 |
| 7,926,632 B2 * | 4/2011 | Mangelschots | ......... | F16F 9/464 188/266.2 |
| 7,980,368 B2 * | 7/2011 | Park | ............... | F16F 9/465 188/282.5 |
| 8,469,162 B2 * | 6/2013 | Nishimura | ............ | B60G 13/06 188/266.2 |
| 9,046,145 B2 * | 6/2015 | Murakami | ............ | F16F 9/325 |
| 9,150,077 B2 * | 10/2015 | Roessle | ............ | F16F 9/348 |
| 9,388,877 B2 * | 7/2016 | Konakai | ............ | F16F 9/34 |
| 9,404,551 B2 * | 8/2016 | Roessle | ............ | F16F 9/464 |
| 9,550,545 B2 * | 1/2017 | Murakami | ............ | B62K 25/28 |
| 9,694,871 B2 * | 7/2017 | Murakami | ............ | B60G 13/06 |
| 9,982,741 B2 * | 5/2018 | Manger | ............ | F16F 9/369 |
| 2009/0242339 A1 * | 10/2009 | Nakadate | ............... | F16F 9/464 188/266.5 |
| 2011/0073424 A1 * | 3/2011 | Murakami | ............ | F16F 9/465 188/322.13 |
| 2012/0305349 A1 | 12/2012 | Murakami et al. | | |

* cited by examiner

SHOCK ABSORBER

TECHNICAL FIELD

The present invention relates to a shock absorber configured to generate a damping force through control of a flow of hydraulic fluid in accordance with a stroke of a piston rod.

BACKGROUND ART

For example, in Patent Literature 1, there is disclosed a hydraulic shock absorber of an adjustable damping force type including an auxiliary disc valve that is provided on an upstream side of a main disc valve in series with the main disc valve. The shock absorber stepwisely (in two steps) opens a main valve, thereby being capable of smoothly changing a damping force.

CITATION LIST

Patent Literature

PTL 1: JP 11-287281 A

SUMMARY OF INVENTION

Technical Problem

In such a hydraulic shock absorber of the adjustable damping force type, an auxiliary valve is arranged on an upstream side of the main valve in series with the main valve. Thus, a total differential pressure generated by the main valve and the auxiliary valve is higher than a differential pressure generated by a main valve without an auxiliary valve, that is, a differential pressure generated by a main valve that is not stepwisely opened. As a result, a damping force in a low speed range of piston speed is relatively large. Therefore, improvement of ride comfort in a soft-side damping force characteristic has been demanded.

It is an object of the present invention to provide a shock absorber capable of smoothly changing a damping force in a low speed range of piston speed and of opening a main valve with a smaller differential pressure.

Solution to Problem

According to one embodiment of the present invention, there is provided a shock absorber, including: a cylinder, in which hydraulic fluid is sealingly contained; a piston, which is slidably fitted to the cylinder: a piston rod, which is coupled to the piston and extended to an outside of the cylinder: and a damping force generating mechanism, which is configured to generate a damping force through control of a flow of the hydraulic fluid that is caused by sliding of the piston in the cylinder, the damping force generating mechanism including: a valve body, which has a communication passage formed therein, and includes an inner seat portion and an outer seat portion that are respectively formed on a center side and an outer peripheral side of the valve body across the communication passage; a main valve of a pilot type, which is provided to be capable of being separated from and seated on the outer seat portion, and is opened by receiving a pressure of the hydraulic fluid, to thereby generate a damping force, a pressure of opening the main valve being adjusted by an internal pressure in a pilot chamber formed on a side opposite to the outer seat portion; a control valve, which is a pressure control valve configured to control the internal pressure in the pilot chamber into which the hydraulic fluid is led; and an auxiliary valve, which is provided on an upstream side of the main valve in series with the main valve, in which the main valve is an annular disc valve that is opened and closed in such a manner that an outer peripheral side thereof is separated from and seated on a valve seat, and in which an inner peripheral side of the main valve is prevented from being clamped from both surface sides thereof, and the main valve is supported only from one surface side on the inner peripheral side by the first retainer.

The shock absorber according to one embodiment of the present invention is capable of smoothly changing the damping force in the low speed range of the piston speed and of opening the main valve with the smaller differential pressure.

DESCRIPTION OF EMBODIMENTS

First Embodiment

A first embodiment of the present invention is described with reference to accompanying drawings. In the following description, an up-and-down direction in FIG. 1 is defined as an up-and-down direction as it is.

Figure 1:
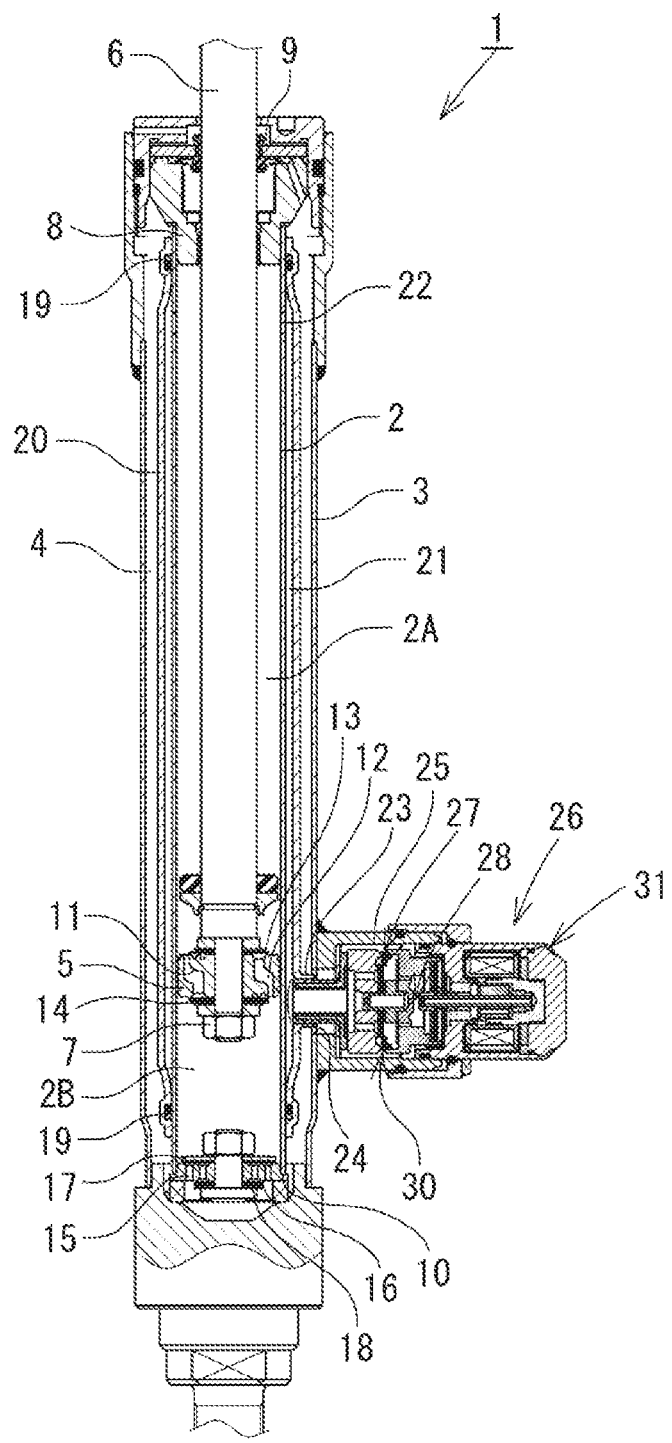
FIG. 1 is a sectional view for illustrating a shock absorber according to a first embodiment of the present invention when taken along one axial plane.

As illustrated in FIG. 1, a shock absorber 1 of an adjustable damping force type, which is a shock absorber according to the first embodiment, has a multi-cylinder structure in which an outer tube 3 is provided on an outer side of a cylinder 2, and a reservoir 4 is formed between the cylinder 2 and the outer tube 3. A piston 5 is slidably fitted to the cylinder 2, and the piston 5 partitions an inside of the cylinder 2 into two chambers, that is, an upper cylinder chamber 2A and a lower cylinder chamber 2B. One end of a piston rod 6 is coupled to the piston 5 with a nut 7. Another end side of the piston rod 6 passes through the upper cylinder chamber 2A, and is inserted through a rod guide 8 and an oil seal 9, which are mounted to upper end portions of the cylinder 2 and the outer tube 3, so as to extend to an outside of the cylinder 2.

A base valve 10 configured to divide the lower cylinder chamber 2B and the reservoir 4 is provided at a lower end portion of the cylinder 2. Passages 11 and 12 configured to allow communication between the upper cylinder chamber 2A and the lower cylinder chamber 2B are formed in the piston 5. A check valve 13 is provided in the passage 12. The check valve 13 allows oil liquid (hydraulic fluid) to flow only from the lower cylinder chamber 2B side to the upper cylinder chamber 2A side. Further, a disc valve 14 is provided in the passage 11. The disc valve 14 is opened when a pressure of the oil liquid on the upper cylinder chamber 2A side reaches a set pressure, and relieves the pressure to the lower cylinder chamber 2B side.

Passages 15 and 16 configured to allow communication between the lower cylinder chamber 2B and the reservoir 4 are formed in the base valve 10. A check valve 17 is provided in the passage 15. The check valve 17 allows the oil liquid to flow only from the reservoir 4 side to the lower cylinder chamber 2B side. Further, a disc valve 18 is provided in the passage 16. The disc valve 18 is opened when the pressure of the oil liquid on the lower cylinder chamber 2B side reaches a predetermined pressure, and relieves the pressure to the reservoir 4 side. As the hydraulic fluid, the oil liquid is sealingly contained in the cylinder 2, and the oil liquid and gas are sealingly contained in the reservoir 4.

A separator tube 20 is outwardly fitted on both upper and lower end portions of the cylinder 2 through intermediation of sealing members 19, and an annular passage 21 is formed between the cylinder 2 and the separator tube 20. The annular passage 21 communicates with the upper cylinder chamber 2A through a passage 22 formed in a side wall of the cylinder 2 at a vicinity of the upper end portion of the cylinder 2. A cylindrical branch tube 23 is formed on a lower portion of the separator tube 20 so as to protrude sideways (rightward in FIG. 1). An opening 24 having a larger diameter than that of the branch tube 23 is formed in a side wall of the outer tube 3 coaxially with the branch tube 23, and a cylindrical case 25 is coupled to the side wall of the outer tube 3 by welding or the like so as to surround the opening 24. A damping force generating mechanism 26 is accommodated in the case 25.

(Damping Force Generating Mechanism)

Figure 2:
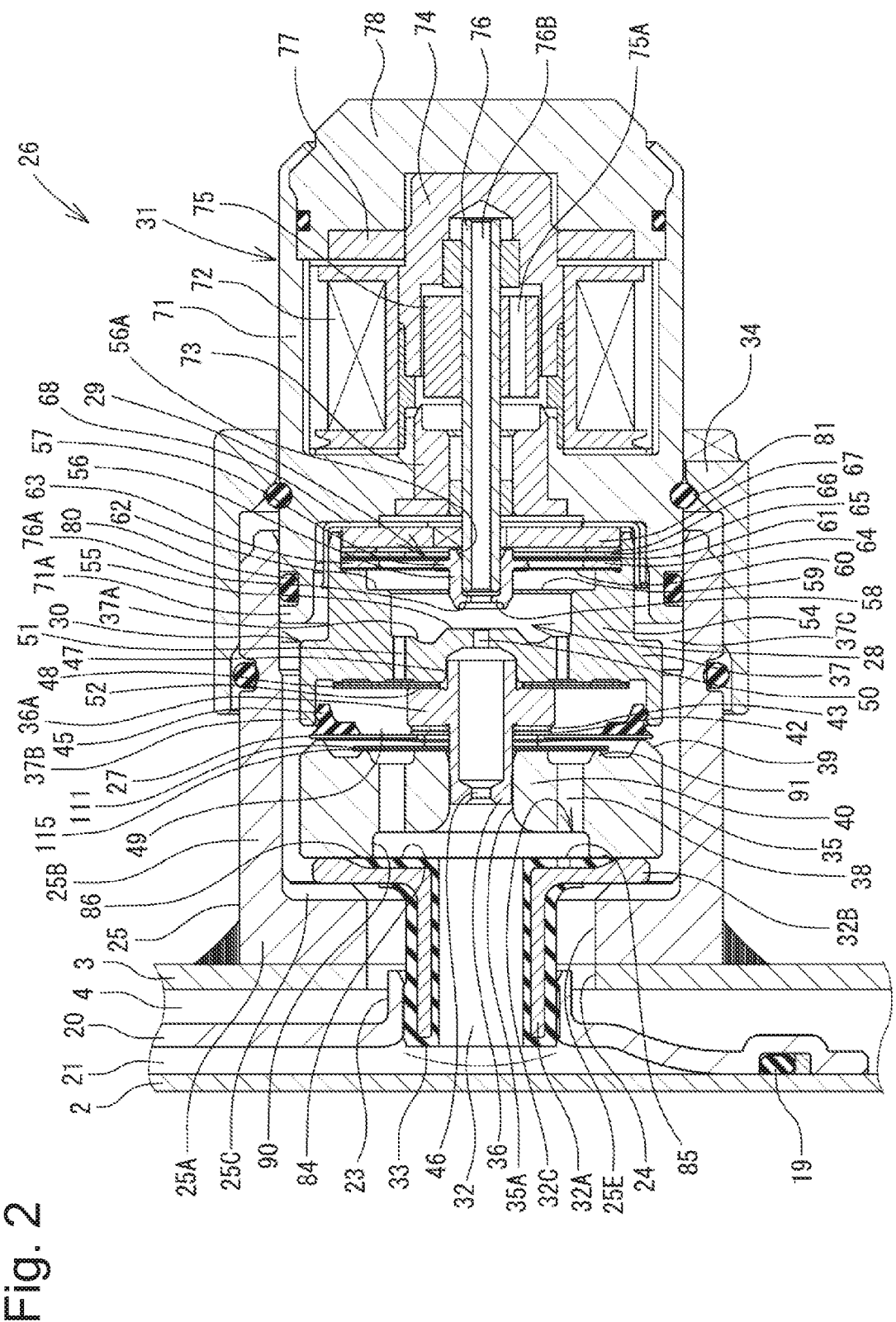
FIG. 2 is an enlarged view for illustrating a damping force generating mechanism of FIG. 1.

As illustrated in FIG. 2, the damping force generating mechanism 26 includes a valve block 30 and a solenoid block 31. A main valve 27 of a pilot type (back pressure type), a pilot valve 28 (control valve), which is a solenoid-driven pressure control valve configured to control a pressure of opening the main valve 27, a fail-safe valve 29, which is provided on a downstream side of the pilot valve 28 and is operated in the event of a failure, and an auxiliary valve 111 are integrally incorporated into the valve block 30. The solenoid block 31 is configured to operate the pilot valve 28. A passage member 32 is inserted in the case 25, and the valve block 30 and the solenoid assembly 31 are coupled and integrated with each other. Further, both of the valve block 30 and the solenoid assembly 31 are inserted in the case 25, and a nut 34 threadedly engaged with the case 25 is fastened. In this manner, the valve block 30, the solenoid assembly 31, and the passage member 32 are fixed in the case 25.

A plurality of cutouts 25C extending in a radial direction are formed on an inner surface side of an inner flange portion 25A formed on one end portion of the case 25, and the cutouts 25C and the opening 24 of the outer tube 3 allow communication between the reservoir 4 and a chamber 25B formed in the case 25. The passage member 32 is fixed in such a manner that a flange portion 32B is formed on an outer periphery of one end of a cylindrical portion 32A having a substantially cylindrical shape, that the cylindrical portion 32A is protruded from an opening 25E of the inner flange portion 25A of the case 25 to be fitted in the branch tube 23, and that the flange portion 32B is held in abutment on the inner flange portion 25A of the case 25. Further, a part of a surface of the passage member 32 is covered with a sealing material 33, and a joining portion between the branch tube 23 and a main body 35 to be described later is sealed by the sealing material 33.

The valve block 30 includes the main body 35 (valve body), a pilot pin 36, and a pilot body 37. The main body 35 has a substantially annular shape, and one end of the main body 35 is brought into abutment on the flange portion 32B of the passage member 32. Further, a plurality of passages 38 are formed along a circumferential direction of the main body 35 so as to pass through the main body 35 in a direction along an axis of the main body 35 (in a right-and-left direction in FIG. 2). Each of the passages 38 communicates with a passage (axial hole) in the passage member 32 through an annular recessed portion 90 formed in one end of the main body 35. An annular outer seat portion 39 protrudes on an outer peripheral side of another end of the main body 35, and an annular inner seat portion 91 protrudes between the outer seat portion 39 and the passages 38 of the main body 35. Further, an annular clamp portion 40 protrudes on an inner peripheral side of the main body 35.

Figure 3:
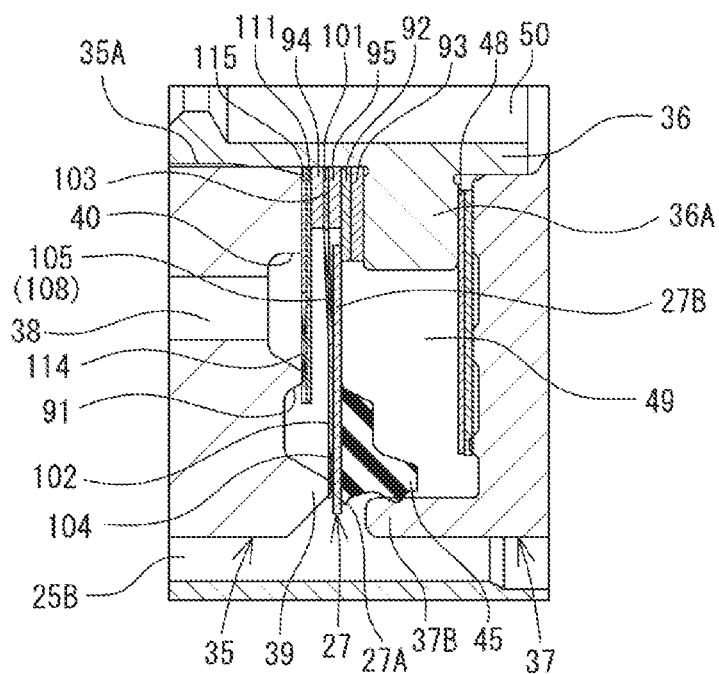
FIG. 3 is an enlarged view for illustrating main components of FIG. 2.

As illustrated in FIG. 2, the pilot pin 36 has a stepped cylindrical shape so as to have a larger diameter portion 36A on a middle portion thereof, and an orifice 46 is formed in one end of the pilot pin 36. One end portion of the pilot pin 36 is press-fitted into the main body 35. As illustrated in FIG. 3, the larger diameter portion 36A and the clamp portion 40 clamp a disc valve 115, the auxiliary valve 111, a washer 94, a cutout valve 101, a washer 95, a first retainer 92, and a second retainer 93 in the stated order from an upstream side. Another end portion of the pilot pin 36 is press-fitted into a passage 50 that is an axial hole of the pilot body 37. As a result, a plurality of passages 47 extending along the direction of the axis (right-and-left direction in FIG. 2) are formed between another end portion of the pilot pin 36 and the passage 50 of the pilot body 37.

The pilot body 37 has a substantially bottomed cylindrical shape so as to have a bottom 37A on a middle portion thereof. The pilot body 37 is fixed in such a manner that the bottom 37A is held in abutment on the larger diameter portion 36A of the pilot pin 36 through intermediation of a flexible disc 48. A sealing member 45 adhering to the main valve 27 is slidably and liquid-tightly fitted on an inner peripheral surface of a cylindrical portion 37B on one end side of the pilot body 37. Thus, a pilot chamber 49 is formed behind the main valve 27. An internal pressure in the pilot chamber 49 is applied to the main valve 27 in a direction of opening the main valve 27. The auxiliary valve 111 is separated from the inner seat portion 91 by receiving a pressure on a side of the passages 38, and thus is opened. In this manner, the main valve 27 is separated from the outer seat portion 39 by receiving the pressure on the side of the passages 38, and thus is opened. As a result, the passages 38 communicate with the chamber 25B in the case 25 on a downstream side.

A passage 51 passes through the bottom 37A of the pilot body 37 in the direction along the axis, and the flexible disc 48 is seated on an annular seat portion protruding around an opening of the passage 51. Further, the flexible disc 48 is bent by the internal pressure in the pilot chamber 49. As a result, volume elasticity is imparted to the pilot chamber 49. Thus, during a valve opening operation of the main valve 27, the internal pressure in the pilot chamber 49 is prevented from excessively increasing and causing an unstable valve opening operation. An elongate cutout 52 extending in the radial direction (up-and-down direction in FIG. 2) is formed in an inner peripheral edge portion of the flexible disc 48 that is to be brought into abutment on the pilot pin 36. The cutout 52 and the passages 47 allow communication between the pilot chamber 49 and the passage 50.

A valve chamber 54 is formed in a cylindrical portion 37C on another end side of the pilot body 37. An annular seat portion 55 is formed on the bottom 37A of the pilot body 37 to protrude along a peripheral edge portion of the opening of the passage 50. A pilot valve member 56 is provided in the valve chamber 54. The pilot valve member 56 is a valve body that constructs the pilot valve 28 and is configured to open and close the passage 50 by being separated from and seated on the seat portion 55. The pilot valve member 56 has a substantially cylindrical shape, and a distal end portion of the pilot valve member 56 to be separated from and seated on the seat portion 55 has a tapered shape. A spring receiving portion 57 having a large diameter and a flange shape is formed on an outer peripheral portion on a proximal end side of the pilot valve member 56. A rod receiving portion 58 having a small diameter is formed on an inner peripheral portion on a distal end side of the pilot valve member 56. A tapered portion 56A is formed on an inner peripheral edge portion of an opening of a rear portion of the pilot valve member 56 so that the opening becomes wider.

The pilot valve member 56 is elastically retained by a pilot spring 59, a fail-safe spring 60, and a fail-safe disc valve 61, which are urging members, so as to be opposed to the seat portion 55 and movable in the direction along the axis. An inner diameter of the cylindrical portion 37C on another end side of the pilot body 37 is stepwisely increased to the opening side, and two stepped portions 62 and 63 are formed on an inner peripheral portion of the cylindrical portion 37C. The stepped portion 62 supports a radially outer end portion of the pilot spring 59. The fail-safe spring 60, an annular retainer 64, the fail-safe disc valve 61, a retainer 65, a spacer 66, and a retaining plate 67 are superposed on the stepped portion 63, and are fixed by a cap 68 fitted to an end portion of the cylindrical portion 37C.

The solenoid assembly 31 is obtained in such a manner that a coil 72, cores 73 and 74 inserted in the coil 72, a plunger 75 guided by the cores 73 and 74, and a hollow operating rod 76 coupled to the plunger 75 are united and incorporated into a solenoid case 71. Those components are fixed by an annular spacer 77 and a cup-like cover 78 that are swaged at a rear end portion of the solenoid case 71. A solenoid actuator includes the coil 72, the cores 73 and 74, the plunger 75, and the operating rod 76. When the coil 72 is energized through a lead wire (not shown), the plunger 75 generates a thrust force in accordance with an electric current in the direction along the axis.

A distal end portion of the operating rod 76 has a tapered shape so as to have a tapered portion 76A on an outer peripheral edge portion thereof. A back chamber of the operating rod 76, the passage 50, and the valve chamber 54 communicate with one another through a communication passage 76B formed in the hollow operating rod 76. Further, a communication passage 75A is formed in the plunger 75, and allows chambers formed on both end sides of the plunger 75 to communicate with each other. The communication passages 76B and 75A balance fluid forces acting on the operating rod 76 and the plunger 75, and apply proper damping forces to movement of the operating rod 76 and the plunger 75.

The solenoid case 71 includes a cylindrical portion 71A formed on one end side thereof. The cylindrical portion 71A is to be fitted into the case 25. A protruding portion of an outer periphery of the cap 68 mounted to the pilot body 37 is fitted into the cylindrical portion 71A. A space between the cylindrical portion 71A and the case 25 is sealed by an O-ring 80. The solenoid case 71 is coupled to the valve block 30 in such a manner that the distal end portion of the operating rod 76 protruding in the cylindrical portion 71A is inserted into the pilot valve member 56 incorporated in the valve block 30, and is further brought into abutment on the rod receiving portion 58, and that the protruding portion of the outer periphery of the cap 68 mounted to the pilot body 37 is fitted into the cylindrical portion 71A. Then, the solenoid case 71 is fixed to the case 25 by constricting, with the nut 34, a snap ring 81 mounted in an outer peripheral groove of the solenoid case 71.

Further, under a state in which the valve block 30 and the solenoid block 31 are coupled to each other and the operating rod 76 is inserted in the pilot valve member 56, while the coil 72 is not energized, as illustrated in FIG. 2, the pilot valve member 56 is retreated together with the operating rod 76 by a spring force of the fail-safe spring 60 so that the spring receiving portion 57 is brought into abutment on the fail-safe disc valve 61. At this time, the pilot spring 59 does not apply a spring force to the pilot valve member 56. When the coil 72 is energized, the operating rod 76 propels the pilot valve member 56 toward the seat portion 55. Thus, the pilot valve member 56 is seated on the seat portion 55 against the spring forces of the fail-safe spring 60 and the pilot spring 59, and the valve opening pressure is controlled by an energization electric current.

(Main Valve)

As illustrated in FIG. 3, the main valve 27 is an annular disc valve that is opened and closed by separating/seating an outer peripheral portion 27A (outer peripheral side) thereof from/on the outer seat portion 39 (valve seat). An inner peripheral portion 27B (inner peripheral side) of the main valve 27 is prevented from being clamped from both surface sides (both right and left sides in FIG. 3) thereof, and the first retainer 92 mounted to the pilot pin 36 supports only the side (right side in FIG. 3) of the inner peripheral portion 27B opposite to the seat portions. The second retainer 93 (retainer having a large diameter) is interposed between the first retainer 92 and the larger diameter portion 36A of the pilot pin 36. The first retainer 92 is positioned with respect to the main body 35 in the direction along the axis (in the right-and-left direction in FIG. 3) by fitting one end portion of the pilot pin 36 to an axial hole 35A of the main body 35. Further, the main valve 27 is seated on the outer seat portion 39 through intermediation of the cutout valve 101 to be described later.

As described above, the annular sealing member 45 formed of an elastic body such as rubber adheres to the side (pilot chamber 49 side) of the main valve 27 opposite to the seat portions. The main valve 27 is centered, that is, positioned with respect to the main body 35 in the radial direction by fitting the outer peripheral portion of the sealing member 45 to the inner peripheral surface of the cylindrical portion 37B of the pilot body 37. Between the main valve 27, and both of the outer seat portion 39 and the inner seat portion 91 of the main body 35 (valve body), the cutout valve 101 is provided. The cutout valve 101 is an annular disc valve including an outer peripheral portion 102 (outer peripheral side) in which four cutouts 104 (slits) are formed at equal intervals. An outer diameter of the main valve 27 is set to be larger than an outer diameter of the annular sealing member 45 and an inner diameter of the cylindrical portion 37B of the pilot body 37.

(Cutout Valve)

Figure 4:
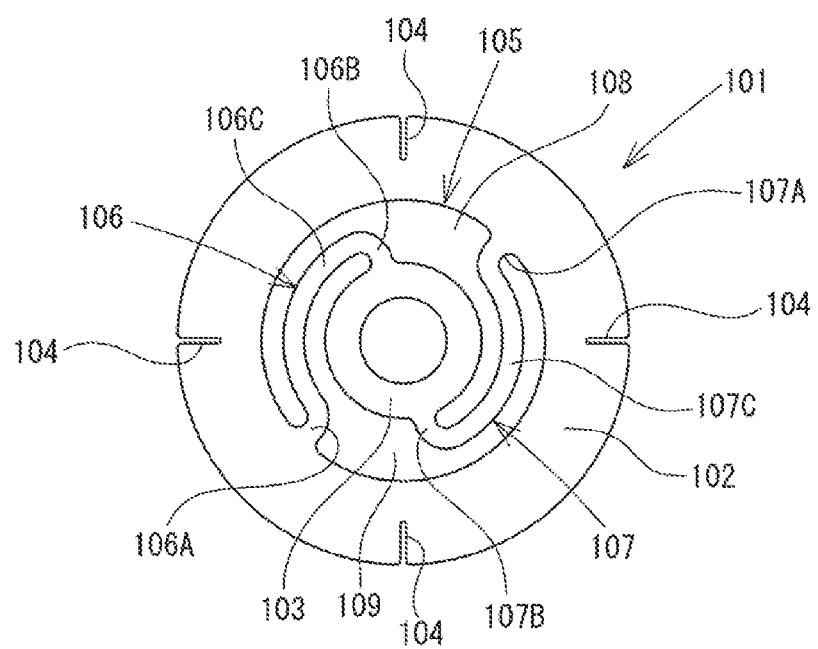
FIG. 4 is a plan view for illustrating a cutout valve used in the first embodiment and a fourth embodiment of the present invention.

An inner peripheral portion 103 (inner peripheral side) of the cutout valve 101 is clamped from both surface sides (both right and left sides in FIG. 3) thereof by the washers 94 and 95 mounted to the pilot pin 36, and a coupling portion 105 having low rigidity is formed between the outer peripheral portion 102 and the inner peripheral portion 103. As illustrated in FIG. 4, the coupling portion 105 includes a pair of coupling pieces 106 and 107 formed by cutting out a part of a portion between the outer peripheral portion 102 and the inner peripheral portion 103. The pair of coupling pieces 106 and 107 each have a substantially S-shape, and are formed so as to be symmetrical with respect to a center line of the cutout valve 101. In other words, between the outer peripheral portion 102 and the inner peripheral portion 103, a pair of cutout portions 108 and 109 are formed so as to be symmetrical with respect to the center line of the cutout valve 101. As described above, the cutout portions 108 and 109 are formed so as to be symmetrical with respect to the center line of the cutout valve 101. Accordingly, when the cutout valve 101 is operated, there is no imbalance in the circumferential direction.

The coupling piece 106 includes an outer end portion 106A connected to the outer peripheral portion 102, an inner end 106B connected to the inner peripheral portion 103, and a spring portion 106C formed between the outer end portion 106A and the inner end 106B to extend in the circumferential direction. The coupling piece 107 includes an outer end portion 107A connected to the outer peripheral portion 102, an inner end 107B connected to the inner peripheral portion 103, and a spring portion 107C formed between the outer end portion 107A and the inner end 107B to extend in the circumferential direction. As illustrated in FIG. 3, an outer diameter of the cutout valve 101 is smaller than the outer diameter of the main valve 27, and a surface of an outer peripheral edge of the outer peripheral portion 102 on the seat portion side (left side in FIG. 3) is set so as to be brought into abutment on (seated on) the outer seat portion 39 of the main body 35. The outer peripheral portion 102 of the cutout valve 101 is brought into close contact with the surface of the main valve 27 on the seat portion side (left side in FIG. 3) by spring forces of the spring portions 106C and 107C of the coupling pieces 106 and 107 so that the respective cutouts 104 form fixing orifices between the main valve 27 and the outer seat portion 39.

(Auxiliary Valve)

As illustrated in FIG. 3, the auxiliary valve 111 is an annular disc valve that is opened and closed by separating/seating an outer peripheral portion 112 (outer peripheral side) from/on the inner seat portion 91, and the auxiliary valve 111 is provided on an upstream side (left side in FIG. 3) of the main valve 27 in series with the main valve 27. Further, the auxiliary valve 111 is positioned in the radial direction by fitting an axial hole thereof to the pilot pin 36, and an inner peripheral portion 113 (inner peripheral side) of the auxiliary valve 111 is clamped from both surface sides (both right and left sides in FIG. 3) thereof by the washer 94 and the clamp portion 40. The annular disc valve 115 including an outer peripheral portion (outer peripheral side) in which a plurality of cutouts 114 (slits) are formed at equal intervals is provided between the auxiliary valve 111 and the inner seat portion 91 of the main body 35 (valve body). The disc valve 115 is formed so as to have an outer diameter equal to the outer diameter of the auxiliary valve 111. The disc valve 115 is superposed on the auxiliary valve 111, and an inner peripheral portion (inner peripheral side) of the disc valve 115 is clamped from both surface sides thereof by the washer 95 and the clamp 40. With this configuration, the respective cutouts 114 form fixing orifices between the auxiliary valve 111 and the inner seat portion 91. The auxiliary valve 111 and the disc valve 115 are each formed to have the outer diameter smaller than the outer diameter of the main valve 27.

Next, operations of the above-mentioned shock absorber 1 of the adjustable damping force type are described.

The shock absorber 1 of the adjustable damping force type is mounted between a sprung side and an unsprung side of a suspension device for a vehicle. In a normal operating state, by energizing the coil 72 by an in-vehicle controller, the pilot valve member 56 is seated on the seat portion 55 of the pilot body 37, thereby causing the pilot valve 28 to execute pressure control.

During an extension stroke of the piston rod 6, the check valve 13 of the piston 5 is closed along with movement of the piston 5 in the cylinder 2. Before the disc valve 14 is opened, the oil liquid (hydraulic fluid) on the upper cylinder chamber 2A side is pressurized. The pressurized oil liquid flows from the branch tube 23 of the separator tube 20 into the passage member 32 of the damping force generating mechanism 26 through a flow passage 22 and the annular passage 21. At this time, a volume of the oil liquid corresponding to a movement amount of the piston 5 flows from the reservoir 4 into the lower cylinder chamber 2B while opening the check valve 17 of the base valve 10. When the pressure in the upper cylinder chamber 2A reaches a pressure of opening the disc valve 14 of the piston 5, the disc valve 14 is opened, and relieves the pressure in the upper cylinder chamber 2A to the lower cylinder chamber 2B, thereby preventing excessive increase in pressure in the upper cylinder chamber 2A.

Meanwhile, during a compression stroke of the piston rod 6, along with movement of the piston 5 in the cylinder 2, the check valve 13 of the piston 5 is opened, and the check valve 17 in the passage 15 of the base valve 10 is closed. Before the disc valve 18 is opened, the oil liquid in the lower piston chamber 2B flows into the upper cylinder chamber 2A, and a volume of the oil liquid corresponding to an entry amount of the piston rod 6 into the cylinder 2 flows from the upper cylinder chamber 2A into the reservoir 4 in the same course as that during the above-mentioned extension stroke. When the pressure in the lower cylinder chamber 2B reaches the pressure of opening the disc valve 18 of the base valve 10, the disc valve 18 is opened, and relieves the pressure in the lower cylinder chamber 2B to the reservoir 4, thereby preventing excessive increase in pressure in the lower cylinder chamber 2B.

Under a state before the main valve 27 is opened (in a low speed range of piston speed), the oil liquid having flowed from the passage member 32 into the damping force generating mechanism 26 flows through the orifice 46 of the pilot pin 36 and the passage 50 of the pilot body 37, and then pushes and opens the pilot valve member 56 of the pilot valve 28 to flow into the valve chamber 54. Then, the oil liquid flows from the valve chamber 54 into the reservoir 4 via the opening of the fail-safe disc valve 61, the opening of the retaining plate 67, a cutout of the cap 68, and the chamber 25B in the case 25.

When the piston speed is increased, and then the pressure of the oil liquid having flowed from the passage member 32 reaches the pressure of opening the main valve 27 and further reaches the pressure of opening the auxiliary valve 111, the oil liquid flows through the annular recessed portion 90 and the passages 38, and opens the main valve 27 and the auxiliary valve 111 to flow into the reservoir 4 through the chamber 25B in the case 25. In an extremely low speed range of the piston speed, the oil liquid having flowed from the passage member 32 flows into the reservoir 4 through the annular recessed portion 90, the passages 38, the cutouts 114 of the disc valve 115, the cutouts 104 of the cutout valve 101, and the chamber 25B in the case 25.

Therefore, during both the extension stroke and the compression stroke of the piston rod 6, before the main valve 27 is opened (in the low speed range of the piston speed), the damping force generating mechanism 26 generates the damping force by the orifice 46 and the pressure of opening the pilot valve member 56 of the pilot valve 28. After the main valve 27 is opened (in a medium speed range of the piston speed), the damping force generating mechanism 26 generates the damping force in accordance with a degree of opening of the main valve 27. In addition, after the auxiliary valve 111 is opened (in a high speed range of the piston speed), the damping force generating mechanism 26 generates the damping force in accordance with a degree of opening of the auxiliary valve 111. Through adjustment of the pressure of opening the pilot valve 28 by the electric current energized to the coil 72, irrespective of the piston speed, the damping force can be directly controlled. At this time, the pressure of opening the pilot valve 28 changes the internal pressure in the pilot chamber 49 that communicates with the passage 50 on the upstream side. Here, the internal pressure in the pilot chamber 49 is applied in a direction of closing the main valve 27. Accordingly, through control of the pressure of opening the pilot valve 28, the pressure of opening the main valve 27 can be adjusted at the same time. Thus, damping force characteristics can be adjusted in a wide range.

Further, when the electric current energized to the coil 72 is reduced and then the thrust force of the plunger 75 is reduced, the pressure of opening the pilot valve 28 is reduced so that a soft-side damping force is generated. Conversely, when the energization electric current is increased and then the thrust force of the plunger 75 is increased, the pressure of opening the pilot valve 28 is increased so that a hard-side damping force is generated. In this manner, the soft-side damping force, which is frequently used, can be generated by a low electric current, thereby being capable of reducing power consumption.

Further, when the thrust force of the plunger 75 is lost at the time of occurrence of a failure such as breaking of the coil 72 or breakdown of the in-vehicle controller, the pilot valve member 56 is retreated by a spring force of the fail-safe spring 60 to open the passage 50, and the spring receiving portion 57 of the pilot valve member 56 is brought into abutment on the fail-safe disc valve 61 to close the flow passage between the valve chamber 54 and the chamber 25B in the case 25. Under this state, a flow of the oil liquid in the valve chamber 54 from the passage 50 into the chamber 25 in the case 25 is controlled by the fail-safe valve 29. Accordingly, a desired damping force can be obtained through setting of the pressure of opening the fail-safe disc valve 61, and the internal pressure in the pilot chamber 49, namely, the pressure of opening the main valve 27 can be adjusted. As a result, an appropriate damping force can be obtained even in the event of a failure.

Figure 5:
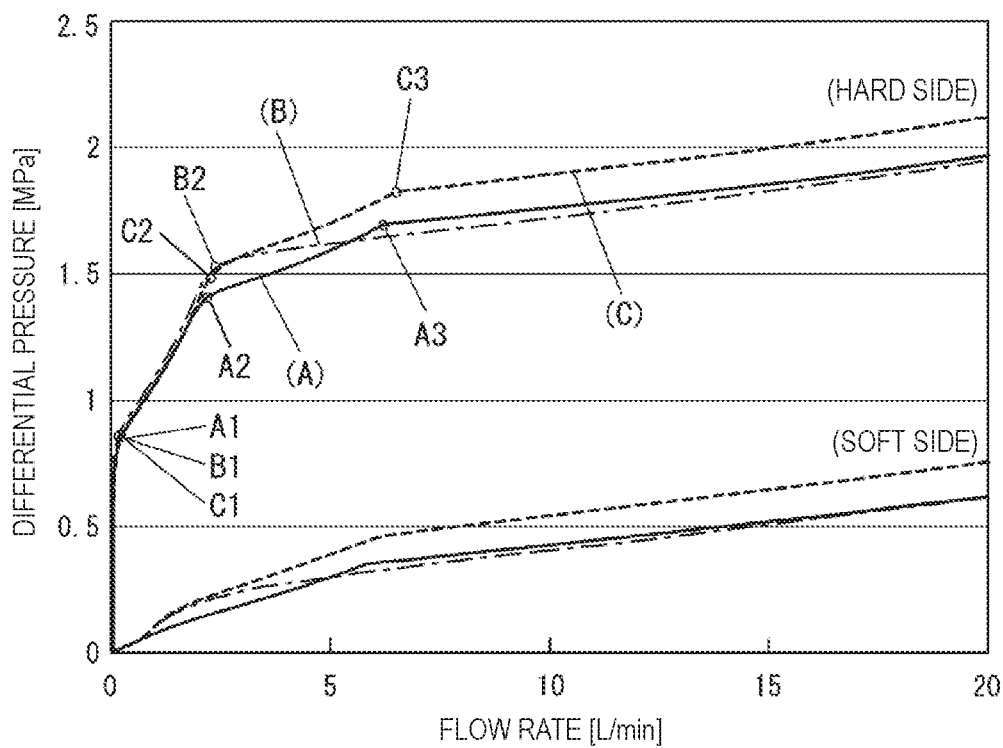
FIG. 5 is an explanatory graph of the first embodiment, for showing relationships (analysis results) between a differential pressure and a flow rate in three types of valve structures, in which a curve (A) shows the relationship between the differential pressure and the flow rate in the valve structure of the first embodiment, in which a curve (B) shows the relationship between the differential pressure and the flow rate in the existing single-step structure, and in which a curve (C) shows the relationship between the differential pressure and the flow rate in the existing two-step structure.

Here, FIG. 5 shows relationships between a differential pressure and a flow rate of the oil liquid (hereinafter simply referred to as "flow rate") in three types of valve structures. In FIG. 5, a curve (A) shows the relationship between the differential pressure and the flow rate in the valve structure of the first embodiment, that is, the valve structure in which the auxiliary valve 111 is provided on the upstream side of the main valve 27 in series with the main valve 27, and in which the inner peripheral portion 27B (inner peripheral side) of the main valve 27 is prevented from being clamped from both the surface sides thereof, and the first retainer 92 supports only the side of the inner peripheral portion 27B opposite to the seat portions. A curve (B) shows the relationship between the differential pressure and the flow rate in the existing valve structure in which the auxiliary valve 111 is not provided, and the inner peripheral portion 27B (inner peripheral side) of the main valve 27 is clamped from both the surface sides thereof (such a structure is hereinafter referred to as "single-step structure"). A curve (C) shows the relationship between the differential pressure and the flow rate in the existing valve structure in which the auxiliary valve 111 is provided on the upstream side of the main valve 27 in series with the main valve 27, and the inner peripheral portion 27B (inner peripheral side) of the main valve 27 is clamped from both the surface sides thereof (such a structure is hereinafter referred to as "two-step structure").

Further, in the curve (A) of FIG. 5, the pilot valve 28 is opened at a point A1, the main valve 27 is opened at a point A2, and the auxiliary valve 111 is opened at a point A3. Meanwhile, in the curve (B) of FIG. 5, the pilot valve 28 is opened at a point B1, and the main valve 27 is opened at a point B2. Further, in the curve (C) of FIG. 5, the pilot valve 28 is opened at a point C1, the main valve 27 is opened at a point C2, and the auxiliary valve 111 is opened at a point C3.

As can be understood from FIG. 5, the valve structure of the first embodiment can obtain, particularly in an initial stage of valve opening in a soft-side damping force characteristic, a predetermined flow rate (for example, 3.5 L/min) with a smaller differential pressure than the single-step structure and the two-step structure. In other words, the valve structure of the first embodiment requires a relatively small differential pressure to obtain the same valve lifting amount in the initial stage of valve opening in the soft-side damping force characteristic. Further, in the valve structure of the first embodiment, the auxiliary valve 111 and the main valve 27 are smoothly lifted and operated in two steps. Accordingly, the flow rate is increased gently from the start of action of the differential pressure in the initial stage of valve opening in the soft-side damping force characteristic.

As described above, according to the valve structure of the first embodiment, a more stable damping force can be generated in the low speed range of the piston speed. Further, in the valve structure of the first embodiment, the inner peripheral side of the main valve 27 is prevented from being clamped, and is simply supported in a cantilever state. Thus, as compared to the existing valve structures (the single-step structure and the two-step structure), rigidity can be set to be lower, and hence the main valve 27 can be opened with a smaller differential pressure. As a result, the damping force in the low speed range of the piston speed in the soft-side damping force characteristic can be set to be lower as compared to the existing valve structures, thereby being capable of contributing to improvement of ride comfort of the vehicle in the soft-side damping force characteristic.

Further, in the valve structure of the first embodiment, the auxiliary valve 111 on the upstream (first-step) side has a small diameter, and is supported in a clamped state. Meanwhile, the main valve 27 on the downstream (second-step) side has a large diameter, and is simply supported. With this structure, a large difference in rigidity between the main valve 27 and the auxiliary valve 111 is set, thereby being capable of preventing the damping force from becoming unstable due to coupled oscillation between the two valves 27 and 111. In addition, in the valve structure of the first embodiment, the main valve 27 is simply supported so that a lifting amount is increased along with reduction in rigidity of the main valve 27, and that breakage of the main valve 27 due to lifting easily occurs. However, the outer diameter of the main valve 27 is set to be larger than a slide diameter of the seat member 45 (inner diameter of the cylindrical portion 37B of the pilot body 37). Accordingly, when the lifting amount of the main valve 27 reaches a fixed amount, the main valve 27 is brought into abutment on an opening end of the cylindrical portion 37B of the pilot body 37. Thus, the main valve 27 can be restrained from lifting excessively, and breakage of the main valve 27 due to lifting can be prevented.

Further, hitherto, in the main valve 27 that has the inner peripheral side clamped from both the surface sides thereof and has the annular sealing member 45 adhering thereto, in order to keep the soft-side damping force characteristic low, a set load (preload) is set to a vicinity of zero. This causes fluctuation of the damping force. However, in the valve structure of the first embodiment, the inner peripheral portion 27B (inner peripheral side) is simply supported, and the cutout valve 101, which has low rigidity and the inner peripheral portion 103 (inner peripheral side) clamped from both the surface sides thereof, is superposed and provided on the seat portion 39 side of the main valve 27. With this structure, the set load can be set to be larger, and sensitivity of the damping force characteristics with respect to the set load is low because rigidity is sufficiently low. Therefore, easy control of the damping force and reduction of fluctuation of the damping force can be achieved, and a problem in the existing valve structures, such as late start of action of the damping force due to insufficiency of the set load, can be prevented. In addition, the cutout valve 101 is formed by coupling the outer peripheral portion 102 and the inner peripheral portion 103 by the two coupling pieces 106 and 107 each having low rigidity, and the outer peripheral portion 102 of the cutout valve 101 is brought into close contact with the main valve 27 by the spring forces of the coupling pieces 106 and 107. Thus, the oil liquid can be prevented from leaking between the main valve 27 and the cutout valve 101, thereby being capable of obtaining a stable damping force.

Second Embodiment

A second embodiment of the present invention is described with reference to accompanying drawings. The same components as those of the above-mentioned shock absorber 1 according to the first embodiment, or corresponding components are denoted by the same terms and the same reference symbols, and detailed description thereof is omitted.

A valve structure of the second embodiment (see FIG. 6) is different from the valve structure of the first embodiment in that, in place of the cutout valve 101 in the valve structure of the first embodiment (see FIG. 3), a disc valve 121 without the cutout portions 108 and 109 is used.

Figure 6:
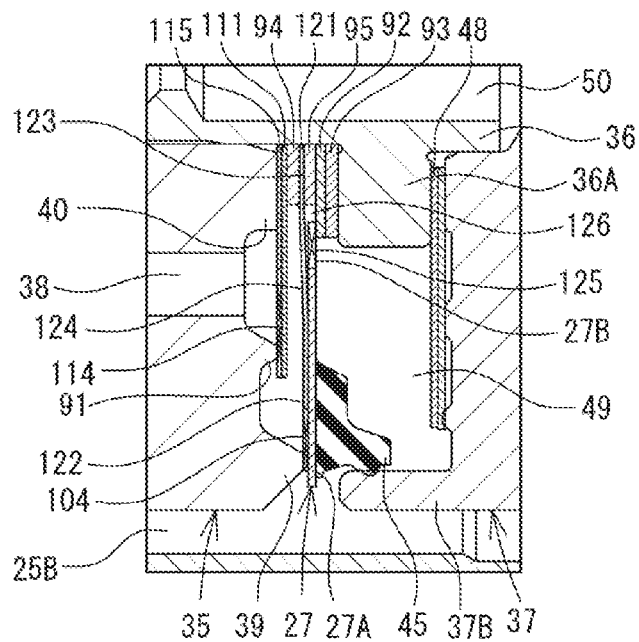
FIG. 6 is a view corresponding to FIG. 3, for illustrating a second embodiment of the present invention.

As illustrated in FIG. 6, an inner peripheral portion 123 (inner peripheral side) of the disc valve 121 (leakage prevention valve) is clamped from both surface sides (both right and left sides in FIG. 6) by the washers 94 and 95, and an annular spring portion 124 is formed between the inner peripheral portion 123 and an outer peripheral portion 122 (outer peripheral side). The spring portion 124 is configured to bring the outer peripheral portion 122 into close contact with the surface of the main valve 27 on the seat portion 39 side. A plurality of cutouts 125 (slits) are formed in an edge portion of the main valve 27 on the inner peripheral side. With this configuration, a chamber 126 defined by the main valve 27, the disc valve 121, the washer 95, and the first retainer 92 is allowed to communicate with the pilot chamber 49.

According to the valve structure of the second embodiment, operations and effects equivalent to those of the valve structure of the first embodiment can be obtained. Further, as compared to the valve structure of the first embodiment employing the cutout valve 101 having low rigidity, the soft-side damping force characteristic is slightly higher in the valve structure of the second embodiment. However, the oil liquid (hydraulic fluid) can be more reliably restrained from leaking into the pilot chamber 49 through between the inner peripheral portion 27B (inner peripheral side) of the main valve 27 and the first retainer 92, thereby being capable of obtaining a more stable damping force. In addition, the chamber 126 and the pilot chamber 49 are allowed to communicate with each other through the cutouts 125 formed in the main valve 27. Thus, the chamber 126 and the pilot chamber 49 can be maintained at the same pressure, thereby being capable of preventing a problem (pressure abnormality) caused when a pressure balance between the chamber 126 and the pilot chamber 49 breaks down.

Further, as compared to the valve structure of the first embodiment employing the cutout valve 101, in the valve structure of the second embodiment, the disc valve 121 is easily manufactured. Accordingly, manufacturing cost can be reduced, and an assembling capability can be enhanced. In addition, a plurality of disc valves 121 can be used in a superposed state. Through selection of the number of the disc valves 121, the damping force can be adjusted.

Third Embodiment

A third embodiment of the present invention is described with reference to accompanying drawings. The same components as those of the above-mentioned shock absorber 1 according to the first and second embodiments, or corresponding components are denoted by the same terms and the same reference symbols, and detailed description thereof is omitted.

Figure 7:
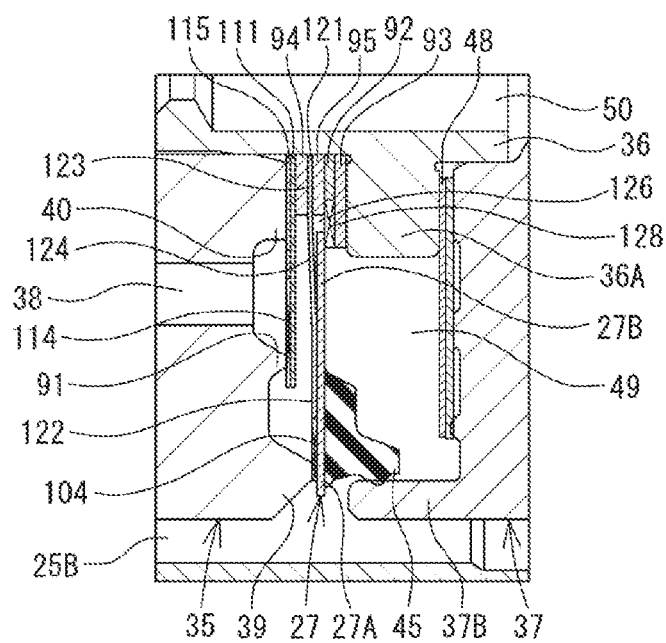
FIG. 7 is a view corresponding to FIG. 3, for illustrating a third embodiment of the present invention.

In the valve structure of the second embodiment (see FIG. 6), the cutouts 125 (slits) configured to allow communication between the chamber 126 and the pilot chamber 49 are formed in an inner-peripheral-side edge portion of the main valve 27. In contrast, in a valve structure of the third embodiment (see FIG. 7), cutouts 128 (slits) configured to allow communication between the chamber 126 and the pilot chamber 49 are formed in an outer-peripheral-side edge portion of the first retainer 92.

According to the valve structure of the third embodiment, operations and effects equivalent to those of the valve structure of the second embodiment can be obtained.

Fourth Embodiment

A fourth embodiment of the present invention is described with reference to accompanying drawings. The same components as those of the above-mentioned shock absorber 1 according to the first embodiment, or corresponding components are denoted by the same terms and the same reference symbols, and detailed description thereof is omitted.

In the valve structure of the first embodiment (see FIG. 3), the first retainer 92, which is configured to simply support (support in a cantilever state) the inner peripheral portion 27B (inner peripheral side) of the main valve 27, is formed to have an outer diameter equal to an outer diameter of the second retainer 93 that is superposed on the first retainer 92 for use. In contrast, in a valve structure of the fourth embodiment (see FIG. 8), the second retainer 93 is formed to have the outer diameter larger than the outer diameter of the first retainer 92. Along with this configuration, a flange-shaped support portion 131 is formed on the main valve 27 side (left side in FIG. 8) of the larger diameter portion 36A of the pilot pin 36, and the support portion 131 is configured to support the outer peripheral side of the second retainer 93 that is increased in diameter.

Figure 8:
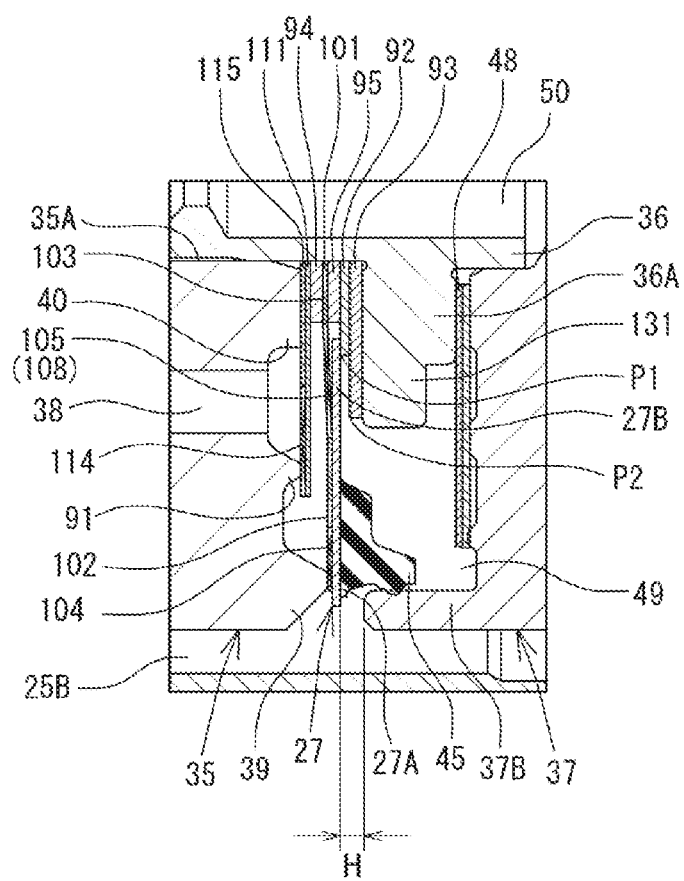
FIG. 8 is a view corresponding to FIG. 3, for illustrating the fourth embodiment.

In the valve structure of the fourth embodiment, in the low speed range of the piston speed (at a low flow rate), the main valve 27 having the simply-supported structure is opened at the outer-peripheral-side edge portion of the first retainer 92 that is a support point P1 (support line) at which the main valve 27 is supported. In the high speed range of the piston speed (at a high flow rate), the main valve 27 is opened at an outer-peripheral-side edge portion of the second retainer 93 that is a support point P2 (support line) at which the main valve 27 is supported. As illustrated in FIG. 8, under a state before the main valve 27 is opened, a distance between the main valve 27 and the second retainer 93 in the direction along the axis (in the right-and-left direction in FIG. 8), in other words, a thickness of the first retainer 92 is set to be shorter (smaller) than a distance H between the main valve 27 and the cylindrical portion 37B of the pilot body 37 in the direction along the axis.

According to the valve structure of the fourth embodiment, operations and effects equivalent to those of the valve structure of the first embodiment can be obtained. Further, in the valve structure of the fourth embodiment, along with increase in the piston speed (flow rate), the support point (support line) at which the main valve 27 is supported is shifted from the inner peripheral side (P1) to the outer peripheral side (P2). With this configuration, as compared to the valve structure of the first embodiment, substantial valve rigidity can be increased. Thus, the lifting amount of the main valve 27 can be prevented from excessively increasing and causing breakage of the main valve 27 due to lifting.

As the shock absorber according to the embodiments described above, for example, the following modes are conceivable. As a first mode of the shock absorber, there is provided a shock absorber, including: a cylinder, in which hydraulic fluid is sealingly contained; a piston, which is slidably fitted to the cylinder: a piston rod, which is coupled to the piston and extended to an outside of the cylinder; and a damping force generating mechanism, which is configured to generate a damping force through control of a flow of the hydraulic fluid that is caused by sliding of the piston in the cylinder, the damping force generating mechanism including: a valve body, which has a communication passage formed therein, and includes an inner seat portion and an outer seat portion that are respectively formed on a center side and an outer peripheral side of the valve body across the communication passage; a main valve of a pilot type, which is provided to be capable of being separated from and seated on the outer seat portion, and is opened by receiving a pressure of the hydraulic fluid, to thereby generate a damping force, a pressure of opening the main valve being adjusted by an internal pressure in a pilot chamber formed on a side opposite to the outer seat portion, a control valve, which is a pressure control valve configured to control the internal pressure in the pilot chamber into which the hydraulic fluid is led: and an auxiliary valve, which is provided on an upstream side of the main valve in series with the main valve, in which the main valve is an annular disc valve that is opened and closed in such a manner that an outer peripheral side thereof is separated from and seated on a valve seat, and in which an inner peripheral side of the main valve is prevented from being clamped from both surface sides thereof, and the main valve is supported only from one surface side on the inner peripheral side by the first retainer.

According to a second mode of the above-mentioned shock absorber, in the first mode, the shock absorber further includes an annular sealing member, which is provided on a side of the main valve opposite to the seat portions, and is slidably and liquid-tightly fitted to an inner tube portion of the pilot chamber.

According to a third mode of the above-mentioned shock absorber, in the first or second mode, the shock absorber further includes a cutout valve, which is provided between the main valve and the seat portions of the valve body, and is formed of an annular disc valve having a cutout on an outer peripheral side thereof. An inner peripheral side of the cutout valve is clamped from both surface sides thereof, and the cutout valve includes a coupling portion that has low rigidity and is formed between the outer peripheral side and the inner peripheral side by cutting out a part of a portion between the outer peripheral side and the inner peripheral side.

According to a fourth mode of the above-mentioned shock absorber, in the third mode, the coupling portion is formed so as to be symmetrical with respect to a center of the cutout valve.

According to a fifth mode of the above-mentioned shock absorber, in the first or second mode, the shock absorber further includes a leakage prevention valve, which is configured to prevent the hydraulic fluid from leaking to the pilot chamber side through between the inner peripheral side of the main valve and the first retainer. The leakage prevention valve has an outer peripheral side that is to be brought into abutment on the outer seat portion side of the main valve, and has an inner peripheral side clamped from both surface sides of the leakage prevention valve.

According to a sixth mode of the above-mentioned shock absorber, in any one of the first to fifth modes, the shock absorber further includes a retainer, which is provided on a side of the main valve opposite to the outer seat portion, and has a diameter larger than a diameter of the first retainer. The retainer having the larger diameter regulates a valve opening amount of the main valve.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention. The above-mentioned embodiments may be arbitrarily combined.

The present application claims priority based on Japanese Patent Application No. 2015-171058 filed on Aug. 31, 2015. All disclosed contents including Specification, Scope of Claims, Drawings, and Abstract of Japanese Patent Application No. 2015-171058 filed on Aug. 31, 2015 are incorporated herein by reference in their entirety.

REFERENCE SIGNS LIST 1 shock absorber, 2 cylinder, 5 piston, 6 piston rod, 26 damping force generating mechanism, 27 main valve, 28 pilot valve (control valve), 35 main body (valve body), 38 passage (communication passage), 39 outer seat portion, 49 pilot chamber, 91 inner seat portion, 92 first retainer, 111 auxiliary valve

The invention claimed is:

1. A shock absorber, comprising:
a cylinder sealingly containing hydraulic fluid;
a piston slidably fitted to the cylinder;
a piston rod coupled to the piston and extended to an outside of the cylinder; and
a damping force generating mechanism configured to generate a damping force through control of a flow of the hydraulic fluid that is caused by sliding of the piston in the cylinder, the damping force generating mechanism including:
  a valve body, which has a communication passage formed therein, and includes an inner seat portion and an outer seat portion that are respectively formed on a center side and an outer peripheral side of the valve body across the communication passage;
  a main valve, which is provided to be capable of being separated from and seated on the outer seat portion, and is opened by receiving a pressure of the hydraulic fluid, to thereby generate a damping force, a pressure of opening the main valve being adjusted by an internal pressure in a pilot chamber formed on a side opposite to the outer seat portion;
  a control valve, which is a pressure control valve configured to control the internal pressure in the pilot chamber into which the hydraulic fluid is led; and
  an auxiliary valve provided on an upstream side of the main valve in series with the main valve,
wherein the main valve is an annular disc valve that is opened and closed in such a manner that an outer peripheral side thereof is separated from and seated on a valve seat, and
wherein an inner peripheral side of the main valve is prevented from being clamped from both surface sides thereof, and the main valve is supported only from one surface side on the inner peripheral side by a first retainer,
the shock absorber further comprising a cutout valve, which is provided between the main valve and the seat portions of the valve body, and is formed of an annular disc valve having a cutout on an outer peripheral side thereof,
wherein an inner peripheral side of the cutout valve is clamped from both surface sides thereof, and
wherein the cutout valve includes a coupling portion that has low rigidity and is formed between the outer peripheral side and the inner peripheral side by cutting out a part of the cutout valve between the outer peripheral side and the inner peripheral side.

2. The shock absorber according to claim 1, further comprising an annular sealing member, wherein the annular sealing member is provided on a side of the main valve facing the pilot chamber, and the annular sealing member is slidably and liquid-tightly fitted to an inner tube portion partly defining the pilot chamber.

3. The shock absorber according to claim 1, wherein the coupling portion is formed so as to be symmetrical with respect to a center of the cutout valve.

4. The shock absorber according to claim 1, further comprising a second retainer, which is provided on a side of the main valve opposite to the outer seat portion, and has a diameter larger than a diameter of the first retainer,
wherein the second retainer, which has the larger diameter, regulates a valve opening amount of the main valve.

5. A shock absorber, comprising:
a cylinder sealingly containing hydraulic fluid;
a piston slidably fitted to the cylinder;
a piston rod coupled to the piston and extended to an outside of the cylinder; and
a damping force generating mechanism configured to generate a damping force through control of a flow of the hydraulic fluid that is caused by sliding of the piston in the cylinder, the damping force generating mechanism including:
  a valve body, which has a communication passage formed therein, and includes an inner seat portion and an outer seat portion that are respectively formed on a center side and an outer peripheral side of the valve body across the communication passage;
  a main valve, which is provided to be capable of being separated from and seated on the outer seat portion, and is opened by receiving a pressure of the hydraulic fluid to thereby generate a damping force, a pressure of opening the main valve being adjusted by an internal pressure in a pilot chamber formed on a side opposite to the outer seat portion;
  a control valve, which is a pressure control valve configured to control the internal pressure in the pilot chamber into which the hydraulic fluid is led; and
  an auxiliary valve provided on an upstream side of the main valve in series with the main valve,
wherein the main valve is an annular disc valve that is opened and closed in such a manner that an outer peripheral side thereof is separated from and seated on a valve seat, and
wherein an inner peripheral side of the main valve is prevented from being clamped from both surface sides thereof, and the main valve is supported only from one surface side on the inner peripheral side by a first retainer,
the shock absorber further comprising a leakage prevention valve, which is configured to prevent the hydraulic fluid from leaking to the pilot chamber side through between the inner peripheral side of the main valve and the first retainer, the leakage prevention valve having an outer peripheral side that is to be brought into abutment on the outer seat portion side of the main valve, and having an inner peripheral side clamped from both surface sides of the leakage prevention valve.

6. The shock absorber according to claim 5, further comprising an annular sealing member, wherein the annular sealing member is provided on a side of the main valve facing the pilot chamber, and the annular sealing member is slidably and liquid-tightly fitted to an inner tube portion partly defining the pilot chamber.

7. The shock absorber according to claim 5, further comprising a second retainer, which is provided on a side of the main valve opposite to the outer seat portion, and has a diameter larger than a diameter of the first retainer, wherein the second retainer, which has the larger diameter, regulates a valve opening amount of the main valve.

\* \* \* \* \*